M. D. OLSEN
PAN.
APPLICATION FILED JUNE 27, 1917.
1,294,528.
Patented Feb. 18, 1919.
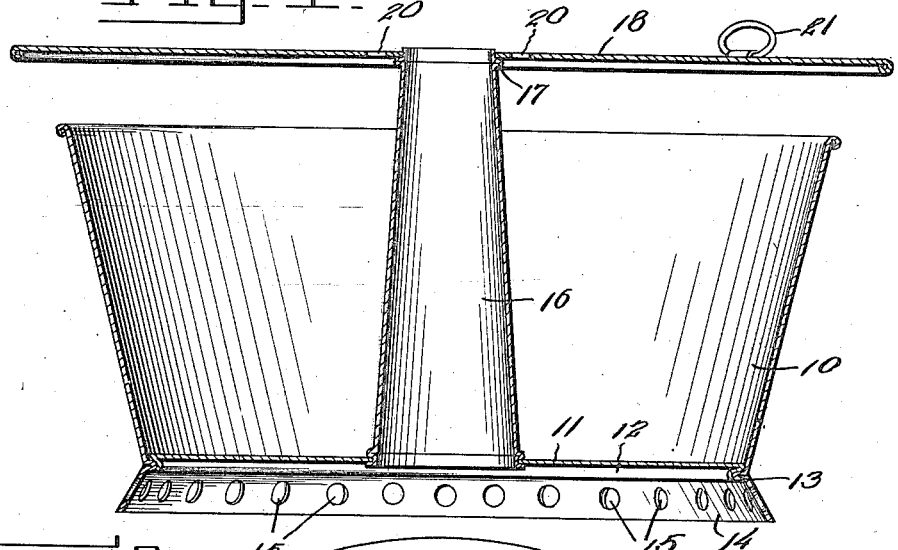
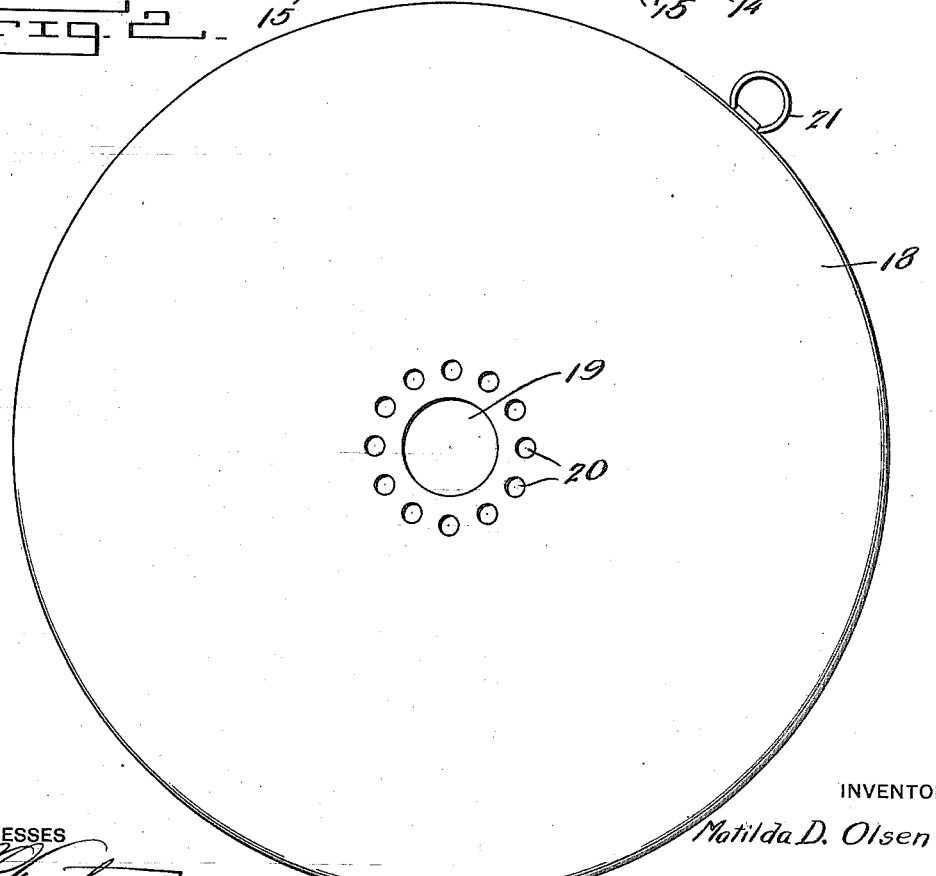
WITNESSES
INVENTOR
Matilda D. Olsen
BY
ATTORNEY

UNITED STATES PATENT OFFICE.

MATILDA D. OLSEN, OF PONY, MONTANA.

PAN.

1,294,528.

Specification of Letters Patent.

Patented Feb. 18, 1919.

Application filed June 27, 1917. Serial No. 177,340.

*To all whom it may concern:*

Be it known that I, MATILDA D. OLSEN, a citizen of the United States, residing at Pony, in the county of Madison and State of Montana, have invented certain new and useful Improvements in Pans, of which the following is a specification.

This invention relates to cooking utensils, and more especially it is a baffle plate capable of being used with a baking pan as a cover therefor when baking is to be done in the oven and top heat is to be kept from the dough or as a baffle beneath the pan when cooking is to be done over a direct fire.

The invention lies in the specific structure of the pan itself and the specific structure of the disk-plate for use therewith, and both are fully described in the following specification.

This invention is illustrated in the accompanying drawings, wherein:—

Figure 1 is a view showing the improved pan and the plate used as a cover therefor, in vertical section, Fig. 2 is a top plan view of the plate alone.

The pan 10 is provided with a bottom 11 having a depending rim 12 engaging a rim 13 extending inwardly from the walls of the pan. The base flange 14 extends beneath the bottom 11 and is provided with openings 15 so that air can circulate beneath the pan and prevent the bottom of the cake from burning. The central column 16 of this pan is connected with and opens through the bottom 11 and is tapered vertically and extends above the upper edge of the pan, the upper portion of the column being crimped to provide an outstanding rib 17 for supporting the plate 18 when serving as a cover. This plate is a flat disk 18 provided with a central opening 19 of a size to receive the upper portion of the column, and also with openings 20 positioned about the central opening 19 for permitting heated air outside the column to pass through the central portion of the plate. This disk is of greater diameter than the upper portion of the pan and will therefore extend beyond the pan so as to deflect the heated air from the upper portion of the oven. A ring 21 is connected with the edge of this disk so that it may be removed when desired.

When the pan is to be used for baking, the dough is placed in the pan to the amount desired and the pan is then placed in the oven. The cover can be put in position before the pan is placed in the oven or the dough can be allowed to rise for a certain length of time and the cover then put in place with the upper portion of the column 16 extending through the opening 19 and with the cover resting upon the supporting rib 17. The parts now stand as shown in Fig. 1, and steam and gases rising from the dough or other material being cooked, will at first escape around the edges of the disk-like cover and through the relatively small perforations 20. Subsequently when the substance begins to take shape and the oven becomes warmer, burning of the top of the cake (if it be cake) is prevented by the interposition of the baffle plate between the cake and the heat above. Bottom heat rushes up through the column 16, around which the dough is probably hottest, and the ring of perforations 20 directly around the main opening 19 permits the escape of excessive heat around the center of the dough or cake as it is forming, so that the same will not be burned at this point. When the cake is removed from the oven, the cover can be then removed from the column or if desired, the pan can be inverted with the cover still in place and the cake shaken loose from the pan. The cake will then drop upon the cover, and this cover will form a device for carrying the cake.

Another use of which this device is capable as a baffle, is when food is to be cooked in the pan while the same rests upon the stove, or more particularly while it overlies an open fire such as a ring-gas-burner for natural or artificial gas. In this case the baffle may be laid over the burner and the pan stood upon the baffle, the flange 14 resting on the disk 18 at a point well within the periphery of the latter because of the disk being relatively larger than the pan as shown. Heat from the burner now strikes the under side of the plate, instead of directly striking the bottom 11 of the pan. It will pass through the opening 19 and the perforations 20 to be sure, but above these it will to an extent spread out under the bottom 11 of the pan and escape through the openings 15 therein, while the greater portion of the heat will pass up the column 16 and escape through its open top. Some of the heat from the burner also will pass around the edge of the disk 18, but it will not strike the side wall of the pan directly. For these reasons the heat is tempered to the contents of the pan by the simple expedient of interposing this baffle plate beneath it or between it and the burner or hot stove.

I am aware that ring-shaped baffle plates have been used in connection with gas stoves to modify the heat to the utensils placed thereon, and of course cooking utensils have hitherto been made whose bottom was raised by a depending base flange similar to that shown herein, but the gist of my invention lies in the provision of a baffle plate whose main opening is of a size to fit reliably upon the tubular column and to rest upon a rib around the same, while its ring of perforations will serve for ventilation purposes; whereas said opening and perforations permit the passage of direct heat to the lower end of said tubular column when the baffle is used beneath the pan. I do not wish to be limited particularly to these uses of my invention, nor to the materials or proportions of parts further than as set forth below.

What is claimed is:—

In a cooking utensil of the type described, the combination with a pan having a raised bottom, a base flange depending from its periphery and pierced with perforations, an upstanding flaring wall rising from said bottom, and an upright tubular central column opening through and rising from the bottom to a point above the upper edge of said wall and provided near its upper end with an outstanding rib; of a removable baffle plate in the form of a flat disk of greater diameter than any portion of said pan, the same being provided with a central opening of a size to pass over the upper end of said column and rest on its rib, and with a ring of perforations around said opening, all for use substantially as described.

In testimony whereof I affix my signature in presence of two witnesses.

MATILDA D. OLSEN.

Witnesses:
WILLIAM OTIS PECK,
JOSEPHINE W. SALVESON.